C. W. DICKINSON.
DISK DRILL.
APPLICATION FILED SEPT. 16, 1909.
964,768.
Patented July 19, 1910.
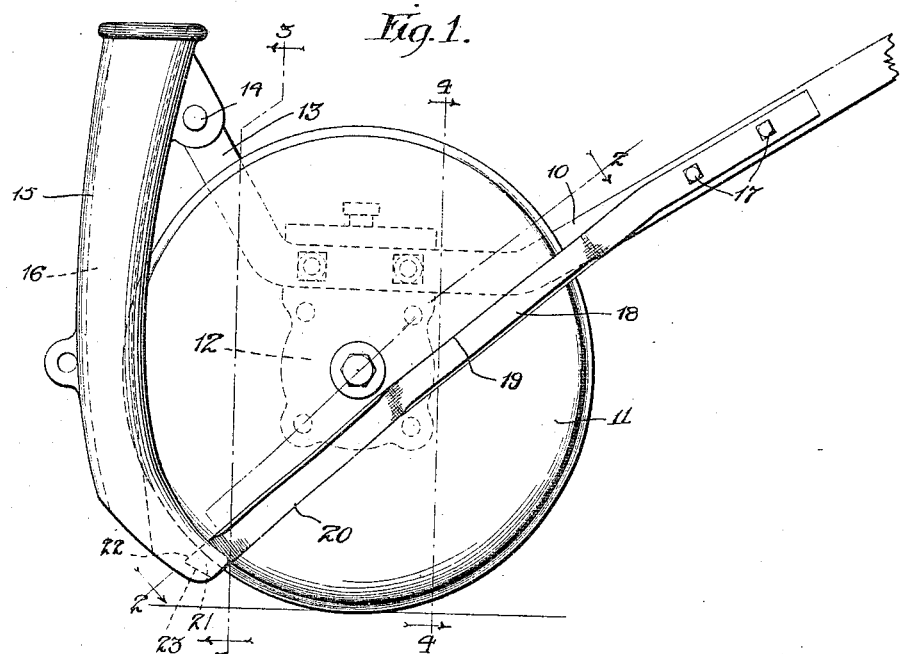
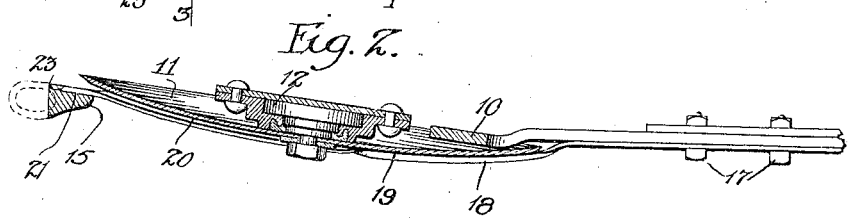
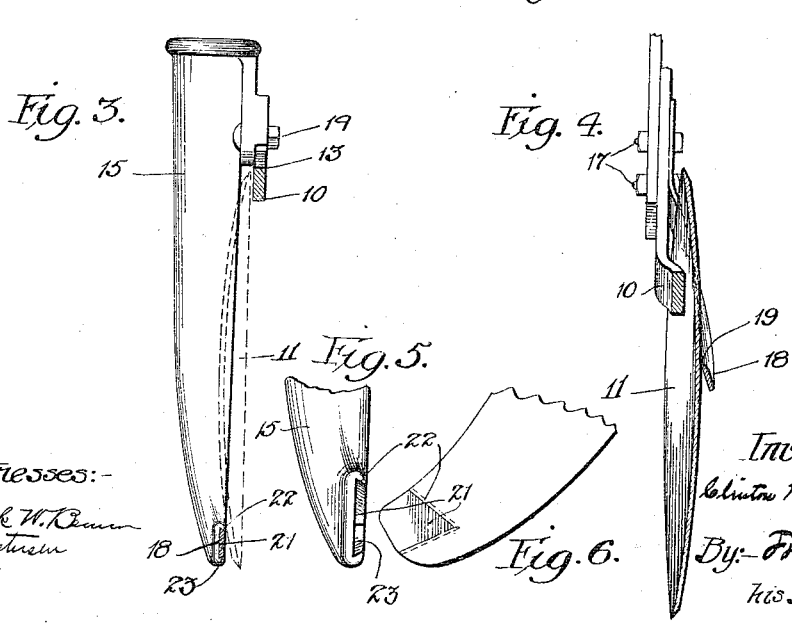

UNITED STATES PATENT OFFICE.

CLINTON W. DICKINSON, OF LA CROSSE, WISCONSIN, ASSIGNOR OF ONE-HALF TO ALBERT HIRSHHEIMER, OF LA CROSSE, WISCONSIN.

DISK DRILL.

964,768.  Specification of Letters Patent.  Patented July 19, 1910.

Application filed September 16, 1909. Serial No. 518,015.

*To all whom it may concern:*

Be it known that I, CLINTON W. DICKINSON, a resident of La Crosse, in the county of La Crosse and State of Wisconsin, have invented certain new and useful Improvements in Disk Drills, of which the following is a full, clear, and exact description.

The invention relates to furrow-openers for grain-drills and designs to provide a single-disk furrow-opener embodying simple and efficient means for keeping the convex face of the disk clean and preventing the accumulation of trash or soil on the seed-boot for delivering the seed into the furrow cut by the disk.

The invention consists in the novel features hereinafter set forth and more particularly defined by claims at the conclusion hereof.

In the drawings: Figure 1 is a side elevation of a furrow-opener embodying the invention. Fig. 2 is a section taken on line 2—2 of Fig. 1. Fig. 3 is a section taken on line 3—3 of Fig. 1. Fig. 4 is a section taken on line 4—4 of Fig. 1. Fig. 5 is a detail front view of the lower end of the seed-boot. Fig. 6 is a detail view of the inner side of the lower end of boot.

A drag-bar 10 serves to support the furrow-opener and seed-boot and is pivotally connected at its front end to the drill-frame, so that the furrow-opener may be lowered into, and raised out of, the soil, as well understood in the art. A concavo-convex disk 11 is journaled in a suitable hanger-bracket 12 which is secured to the drag-bar 10 and thereby the disk is supported to travel at an angle to the line of draft to cut a furrow as it is drawn through the soil. The drag-bar and disk-journal are disposed at the concave side of the disk and the rear portion of the drag-bar is extended upwardly and rearwardly, as at 13, and has secured thereto by a bolt 14, a seed-boot 15 having a seed-conduit 16 extending therethrough. The seed-boot is disposed behind or within the angle of the disk and adjacent the rear edge of the latter to cause the seed to be delivered into the furrow cut by the angled disk. A scraper-blade 18 has its front and upper end secured to the drag-bar 10 which supports the disk by bolts 17 and extends rearwardly and downwardly across the convex face of the disk to the lower end of the boot. This blade has a scraping-edge 19 engaging the disk forwardly of the disk axis and an oppositely disposed scraping-edge 20 extending rearwardly of the axis of the disk to the lower portion of the seed-boot. The drag-bar is disposed at the concave side of the disk and the scraper-blade secured thereto passes in front of the disk-edge and across the space between the drag-bar and the disk at the front of the latter and resultantly, this portion of the blade tends to prevent stubble or trash from passing into the space between the drag-bar and the concave face of the disk. The scraper-blade is formed to provide the scraping-edge 19 at its upper edge for engaging the downwardly moving portion of the disk and at its lower end with the scraping edge 20 at its lower edge to scrape the upwardly traveling portion of the disk. This blade is usually formed of a slightly flexible strip, so that it will adapt itself to the form of the disk. The lower or rear end of the scraper-blade is disposed between the boot-terminal and the disk and is confined against lateral play thereby, so that it may effectively serve to scrape the disk without necessarily being secured or attached to the boot-terminal and is disposed to prevent the soil or trash from accumulating around the boot. Resultantly, when the disk is drawn forwardly through the soil and the lower end of the boot and scraper are traveling in the furrow cut by the disk, the scraping-edge 20 will scrape the disk and deflect the soil or trash laterally and sufficiently to prevent the accumulation of soil or trash around the boot or between the boot and the disk.

In working the furrow-openers in some soils, the soil sometimes falls against the rear portion of the disk above the scraper or the soil is thrown against this portion of the disk by another furrow-opener of a gang and if such soil adheres to the disk, the scraping-edge 19 will effectively remove it from the disk and deflect it laterally of the furrow.

The lower end of the boot is formed with an angular recess 21 adapted to receive the rear or lower end of the scraper-blade and the upper edge 22 of this seat is angled so that the scraper fitting into it will be secured against lateral and upward movement thereby, and the lower or rear edge of the seat is angled forwardly and downwardly, as at 23, to receive the angled rear edge of the blade and to hold it against downward movement. Resultantly, the scraper will be held in substantially fixed relation to the disk by the lower end of the boot without the necessity of bolting or attaching the lower or rear end of the scraper to the boot and the scraper may be readily removed by disconnection of its front end from the drag-bar.

The invention thus provides simple means for keeping the disk clean and preventing the accumulation of trash around the boot. By providing scraping means, which effects a double scraping action, that is, a scraping action of the rear portion of the disk and another scraping action of the front portion of the disk, the latter is kept unusually clean and free from accumulation of soil or trash. Furthermore, by providing a scraper which may be left unattached to the lower end of the boot and to the disk-bearing, such as results from securing the scraper to the drag-bar or disk-support at the front of the disk, the scraper may be readily removed when desired, since in some soils scrapers for the convex face of the disk are unnecessary. By merely disconnecting the scraper from the drag-bar, the scraper may be removed so that the furrow-opener may be operated without such a scraper. By providing a double action scraper, soil which adheres to the disk is removed therefrom at the front of the disk-axis, so that that portion of the disk which is entering the soil is always kept clean and resultantly, the tendency of the disk to clog is materially lessened.

The invention is not to be understood as restricted to the details shown and described, since these may be modified within the scope of the appended claims without departing from the spirit and scope of the invention.

Having thus described the invention, what I claim as new and desire to secure by Letters Patent, is:

1. In a disk-drill, the combination of a concavo-convex disk, means for supporting the disk to travel at an angle to the line of draft, a boot having a seed-conduit therein and disposed adjacent the rear of the disk, and a scraper-blade secured at its front to the disk-supporting means in front of the disk-axis, and extending downwardly and rearwardly to the lower portion of the boot and engaging the convex face of the disk.

2. In a disk-drill, the combination of a concavo-convex disk, means for supporting the disk to travel at an angle to the line of draft, a boot having a seed-conduit therein and disposed adjacent the rear of the disk, and a scraper-blade secured at its front or upper end to the disk-supporting means in front of the disk-axis and extending downwardly and rearwardly across the convex face of the disk to the lower end of the boot and engaging the convex face of the disk.

3. In a disk-drill, the combination of a concavo-convex disk, means for supporting the disk to travel at an angle to the line of draft, a boot having a seed-conduit therein and disposed adjacent the rear of the disk, and a scraper-blade extending rearwardly and downwardly across the convex face of the disk to the lower end of the boot and having a scraping-edge for engaging the disk forwardly of the disk-axis.

4. In a disk-drill, the combination of a concavo-convex disk, means for supporting the disk to travel at an angle to the line of draft, a boot having a seed-conduit therein disposed adjacent the rear of the disk, and a scraper-blade extending rearwardly and downwardly across the convex face of the disk and having a scraping-edge for engaging the disk at the opposite sides of the disk-axis respectively.

5. In a disk-drill, the combination of a concavo-convex disk, a drag-bar and bearing whereby the disk is supported to travel at an angle to the line of draft, a boot having a seed-conduit therein connected to the drag-bar, and a scraper-blade secured to the drag-bar in front of the disk-axis and extending downwardly and rearwardly to the lower portion of the boot and engaging the convex face of the disk.

6. In a disk-drill, the combination of a concavo-convex disk, a drag-bar and bearing whereby the disk is supported to travel at an angle to the line of draft, a boot having a seed-conduit therein connected to the drag-bar, said drag-bar being disposed at the concave side of the disk and a scraper-blade secured to the drag-bar and extending across the edge of the disk and downwardly and rearwardly to the lower portion of the boot and engaging the convex face of the disk.

7. In a disk-drill, the combination of a concavo-convex disk, means at the concave side of the disk for supporting the disk to travel at an angle to the line of draft, a boot having a seed-conduit therein and disposed adjacent the rear of the disk, and a scraper-blade secured at its front to the disk-supporting means in front of the disk-axis and extending downwardly and rearwardly to the lower portion of the boot and engaging the convex face of the disk.

8. In a disk-drill, the combination of a concavo-convex disk, means at the concave side of the disk for supporting the disk to travel at an angle to the line of draft, a boot having a seed-conduit therein and disposed adjacent the rear of the disk, and a scraper-blade secured at its front or upper end to the disk-supporting means in front of the disk-axis, and extending downwardly and rearwardly across the convex face of the disk to the lower end of the boot and engaging the convex face of the disk.

9. In a disk-drill, the combination of a concavo-convex disk, a drag-bar and bearing at the concave side of the disk for supporting the disk to travel at an angle to the line of draft, a boot having a seed-conduit therein and disposed adjacent the rear of the disk and a scraper-blade secured at its front to the drag-bar and extending in front of the edge of the disk and downwardly and rearwardly to the lower portion of the boot, and engaging the convex face of the disk.

10. In a disk-drill, the combination of a concavo-convex disk, a drag-bar and bearing at the concave side of the disk for supporting the disk to travel at an angle to the line of draft, a boot having a seed-conduit therein and disposed adjacent the rear of the disk and a scraper-blade secured at its front to the drag-bar and extending in front of the edge of the disk and downwardly and rearwardly to the lower portion of the boot, and having oppositely disposed scraping edges for engaging the convex face of the disk.

11. In a disk-drill, the combination of a concavo-convex disk, a drag-bar and bearing whereby the disk is supported to travel at an angle to the line of draft, a boot having a seed-conduit therein connected to the drag-bar, and a scraper-blade having its front or upper end secured to the drag-bar and extending rearwardly and downwardly across the convex face of the disk to the lower end of the boot, and having a scraping-edge forwardly of the disk-axis.

12. In a disk-drill, the combination of a concavo-convex disk, a drag-bar and bearing whereby the disk is supported to travel at an angle to the line of draft, a boot having a seed-conduit therein connected to the drag-bar, and a scraper-blade having its front or upper end secured to the drag-bar in front of the disk-axis and extending rearwardly and downwardly across the convex face of the disk to the lower end of the boot, and having a scraping-edge rearwardly of the disk-axis.

13. In a disk-drill, the combination of a concavo-convex disk, a drag-bar and bearing whereby the disk is supported to travel at an angle to the line of draft, a boot having a seed-conduit therein connected to the drag-bar, and a scraper-blade having its front or upper end secured to the drag-bar and extending rearwardly and downwardly across the convex face of the disk to the lower end of the boot, and having oppositely disposed scraping-edges forwardly and rearwardly of the disk-axis respectively.

14. In a disk-drill, the combination of a concavo-convex disk, means for supporting the disk to travel at an angle to the line of draft, a boot having a seed-conduit therein disposed adjacent the rear of the disk, and a scraper-blade having oppositely disposed scraping-edges engaging different portions of the convex face of the disk.

15. In a disk-drill, the combination of a concavo-convex disk, means for supporting the disk to travel at an angle to the line of draft, a boot disposed adjacent the rear of the disk and having a seed-conduit therein, and a scraper-blade for the convex face of the disk, having its front or upper end secured to the supporting-means, the lower end of the boot being provided with a seat formed for said blade, the rear end of the scraper being extended to engage said seat and to be held against downward movement thereby.

16. In a disk-drill, the combination of a concavo-convex disk, means for supporting the disk to travel at an angle to the line of draft, a boot disposed adjacent the rear of the disk and having a seed-conduit therein, and a scraper-blade for the convex face of the disk, having its front or upper end secured to the supporting-means, the lower end of the boot being provided with a seat for the scraper on one side thereof, and the rear end of the scraper being angled downwardly and forwardly to engage the seat and be held against downward movement thereby.

17. In a disk-drill, the combination of a concavo-convex disk, means for supporting the disk to travel at an angle to the line of draft, a boot disposed adjacent the rear of the disk and having a seed-conduit therein, and a scraper-blade for the convex face of the disk, having its front or upper end secured to the supporting-means, the lower end of the boot being provided with an angular seat on one of its sides, the scraper being formed to engage the angular seat and be held against upward or downward movement thereby.

CLINTON W. DICKINSON.

Witnesses:
R. D. FENTRESS,
RENA TIMMINGS.